Jan. 11, 1944.  D. R. ZUCK  2,338,751
FOLDING WING ON AIRCRAFT
Filed Jan. 9, 1939  4 Sheets-Sheet 1

INVENTOR.
Daniel R. Zuck

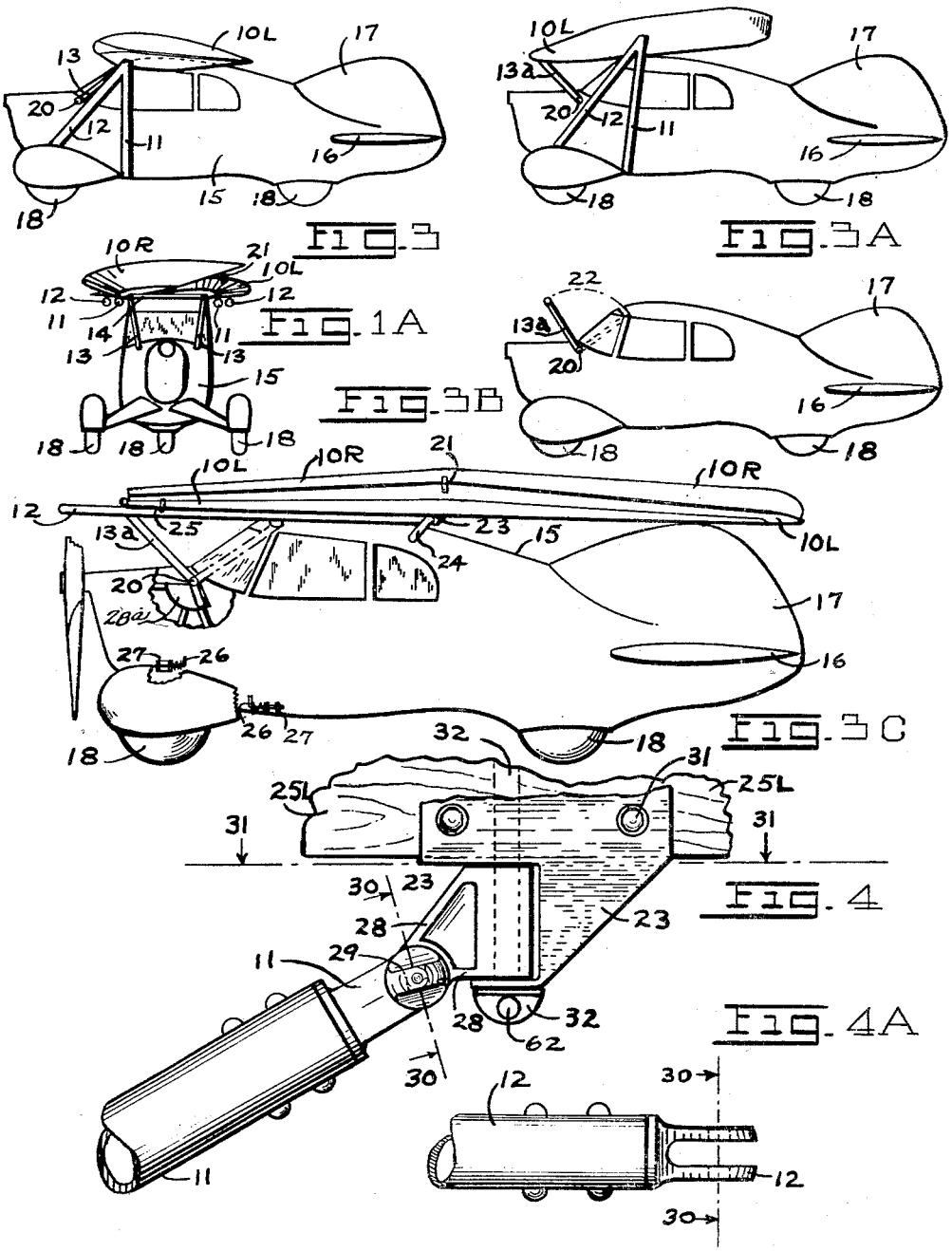

Jan. 11, 1944.                    D. R. ZUCK                    2,338,751
                          FOLDING WING ON AIRCRAFT
                            Filed Jan. 9, 1939          4 Sheets-Sheet 3
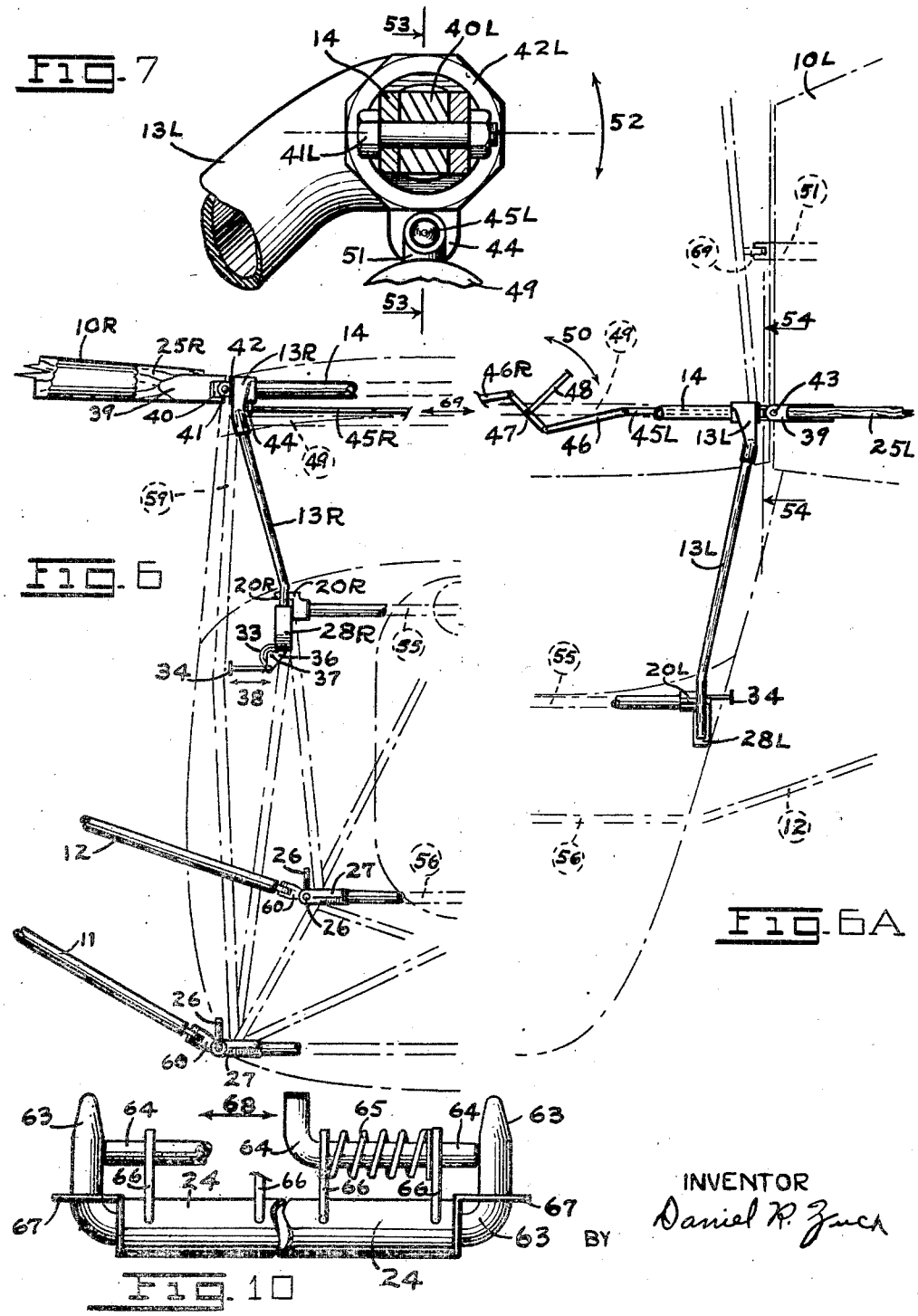
INVENTOR
Daniel R. Zuck
BY Jan. 11, 1944.  D. R. ZUCK  2,338,751
FOLDING WING ON AIRCRAFT
Filed Jan. 9, 1939  4 Sheets-Sheet 4
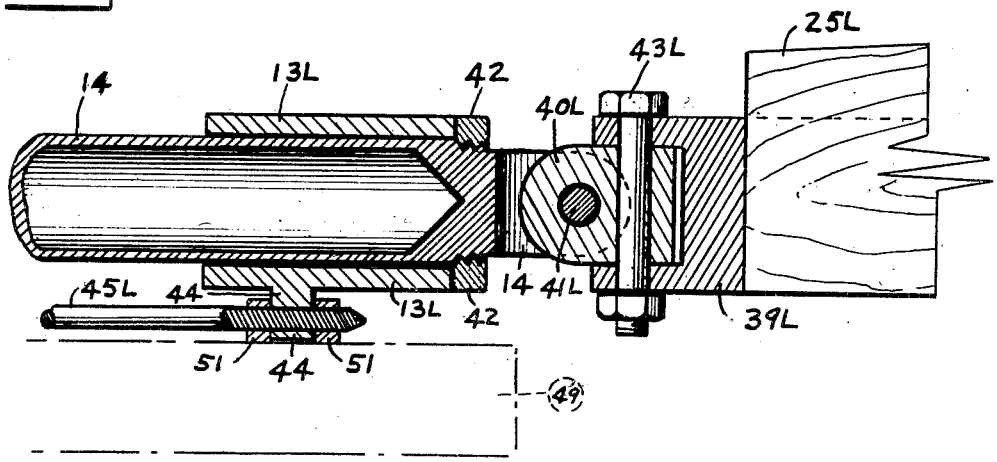
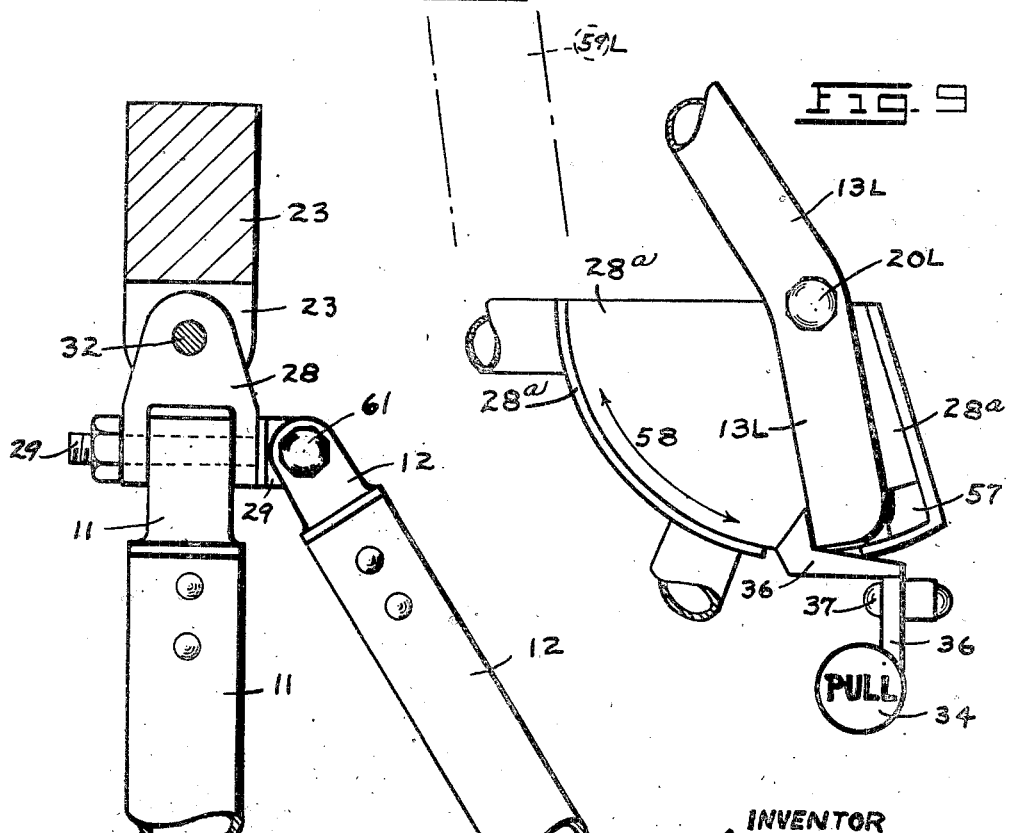
INVENTOR
Daniel R. Zuck
BY Patented Jan. 11, 1944

2,338,751

UNITED STATES PATENT OFFICE 2,338,751

FOLDING WING ON AIRCRAFT

Daniel R. Zuck, San Diego, Calif.

Application January 9, 1939, Serial No. 249,957

12 Claims. (Cl. 244—49)

This invention relates to aircraft, method of folding aircraft wings, and the improvement of wing folding mechanisms.

An airplane both in storage and for contemplated road use suffers from one outstanding handicap—the want of an efficient method of disposing or stowing the wings so that they will not hinder the aircraft as a roadable vehicle, and also to allow the airplane to be parked or hangared in a smaller space than is possible with wings extended.

It is recognized that many methods and types of wing-folding mechanisms have been disclosed by earlier patentees. While these earlier disclosures of the art have revealed serviceable and practical mechanisms, all have failed to produce or contemplate a practical method and means of stowing or disposing the wings to give the aircraft satisfactory roadability properties, nor have these earlier disclosures of wing-folding mechanisms given the aircraft the most efficient use of its parking or storage space.

The primary object of this invention is to provide a method and means of folding aircraft wings so that they shall occupy a minimum of space on the top of the aircraft, and to secure the wings so folded to enable the aircraft to move about on the highway or elsewhere. More specifically, it is the purpose of this invention to accomplish two operations: first, to fold the wings compactly so that said wings, right and left respectively, shall lie one over the other, and to stow the wings thus folded on the top of the fuselage or body in a manner which will allow the aircraft to be driven on the road, or to permit said aircraft to be hangared or housed in a smaller storage space; and second, to move the inner ends or fuselage ends of said wings forwardly with respect to the fore and aft axis of the fuselage, for the purpose of stowing the wings more advantageously when said wings are folded.

Another object is to provide a means of connecting the wings to the flying struts so that said wings will be capable of being pivoted on a longitudinal axis and on a vertical axis in folding.

Another object is to provide a center section, connected and disposed in a manner which will maintain the wings in spaced relation to each other, which is capable of being moved fore and aft with respect to the fuselage, allowing therewith the inner ends or fuselage ends of the wings to travel forwardly with respect to the fuselage and the wing tips to travel rearwards with respect to said fuselage when said center section is moved forwardly in folding the wings.

Another object is to provide a means of connection between the inner ends of the wings and the above described center section so that said center section in folding and unfolding or extending of said wings may travel fore and aft with respect to the fore and aft axis of the fuselage, and vertically with respect to the vertical axis of the aircraft.

Another object is to provide a means to automatically stop and maintain the center section in its two extreme positions, maximum rearward and maximum forward position respectively with respect to the fore and aft axis of the fuselage.

Another object is to embody in the connection between wings and center section a means which will allow the trailing edges of the respective outer wings to pass one over the other when said wings are being folded one over the other.

Another object is to secure the wings to the fuselage in both their completely folded and fully extended positions.

With the above and other objects in view the invention consists of certain novel details of construction and combination of parts hereinafter fully described and claimed, it being understood that various modifications may be resorted to within the scope of the appended claims without departing from the spirit or sacrificing any of the advantages of the invention.

In the accompanying drawings forming a part of this specification, all like numbers indicate identical parts, and the letters L and R represent left hand and right hand parts respectively, thus: 10L and 10R symbolize identical parts except one is left hand and the other is right hand. When the number is referred to without being followed by the letter L or R, as the number 10, no distinction is made between the right and left hand. Numbers given and followed by letters A, B, or C refer to related illustrations.

Figure 1A is a front view of the same airplane with the wings completely folded one over the other across the top of the fuselage, and the wing struts removed from the fuselage connections and suspended parallel to the bottom of the wings.

Figure 3 is a side view of the airplane shown in Figures 1 and 2.

Figure 3A is a side view of the same airplane with the inner ends of the wings moved forward as folding of the wings begins, as is indicated by the broken lines in Figure 2.

Figure 3B is a side view of the airplane with the wings removed to show the arcaded motion which causes the inner ends of the wings to move forward and rearward with respect to the fore and aft axis of the fuselage.

Figure 1:
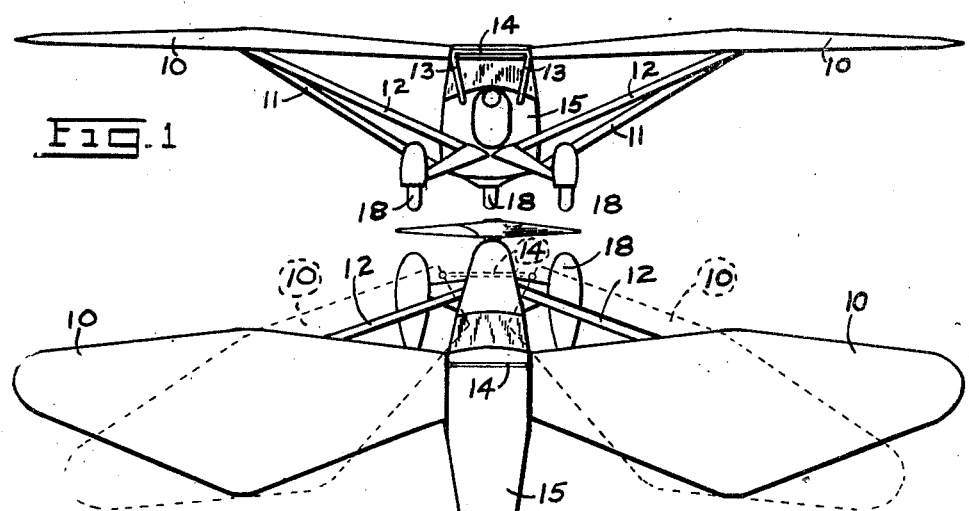
Figure 1 is a front view of an airplane embodying my invention.

Figure 3C is an enlarged side view of the airplane showing the wings completely folded one over the other, and the wing struts removed from their fuselage connections and suspended parallel to the under surface of the wings, and the auxiliary suspending links to support the wings and struts in the folded position, and a section broken away to show the pivotal axis and pivotal limit of the arcaded motion of the inner or fuselage ends of the wings.

Figure 4 is an enlarged fragmental section showing the connection of the rear wing strut with the wing spar in the mid semi-span.

Figure 4A is an enlarged fragmental section of the front wing strut. Line 30—30 is identical and coaxial with line 30—30 of Figure 4 when the front and rear struts are in proper assembly.

Figure 5 is a section disclosing the intersection of the front and rear wing strut at the wing with the wing spar in the mid semi-span taken on the line 31—31 in Figure 4.

Figure 6 is an enlarged fragmental right-hand front view of the airplane showing some of the pertinent features relating to my invention in heavy ink.

Figure 6A is an enlarged fragmental left-hand view of the airplane disclosing in a top view in heavy ink the identical features, except for the change in hand, shown in Figure 6.

Figure 7 is an enlarged fragmental section taken on the line 54—54 in Figure 6A.

Figure 8 is a fragmental section taken on a line 53—53 of Figure 7 with the illustration of said Figure 7 transposed to its true assembly position in the airplane.

Figure 9 is an enlarged fragmental section showing the mechanism which allows the fuselage ends of the wings to move fore and aft with respect to the fuselage, and the stop to impose a maximum forward rotation, and the mechanism which maintains the wings in their maximum forward position with respect to the fore and aft axis of the fuselage.

Figure 10 discloses a typical auxiliary suspending link shown in fragments. Said links are used as auxiliary means for suspending the wings from the fuselage, the wings from each other, and the struts from the wings when said wings are folded.

Aircraft as herein used shall adhere strictly to the definition of aircraft, excluding the type designed to receive its support in the air by buoyancy of the structure, but including all of the type which receives its support by the dynamic action of the air against its surfaces.

Airplane as herein referred to includes all structures of the non-rotating wing type; this includes those lifting airfols which have limited or unlimited turning movement around a lateral axis with respect to the fuselage and the plane of the airfoil. By rotating wing type aircraft is meant those lifting airfols which rotate around a vertical axis relative to the fuselage and the plane of the airfoil.

My invention as herein disclosed is adapted to an airplane designed for road use. Aircraft designed for road use are often referred to as roadable aircraft, and to date said roadable aircraft have experienced difficulty in disposing of the wings for road use. Many patentees have disclosed means to fold the wings back along the fuselage, but all methods to date provide the airplane with too much bulk for efficient road use—even the roadable autogiro does not fold its sustaining planes or rotor efficiently. The sustaining planes of a roadable autogiro when folded protrude beyond the tail of the aircraft and also a considerable distance above the fuselage, making said roadable autogiro an unsatisfactory road vehicle. To accomplish greater stowing efficiency of the sustaining planes of the roadable autogiro, as well as the airplane upon which my invention is disclosed, it is necessary to provide the inner ends of the sustaining planes with a carriage to move in two directions, vertically and longitudinally relative to the fuselage.

The aircraft to which my invention is adapted, the chord of the sustaining planes is equal to or greater than the tread of the wheels and the width of the body of an ordinary roadable vehicle. To fold the outer wings with the trailing edges adjacent, as many patentees have disclosed, will give the roadable aircraft as herein shown and which is typical of most airplanes an overall width of the folded wings much greater than the fuselage and tread of the wheels. It therefore enhances the practicability of an airplane to fold the sustaining planes or wings one over the other. A method and means of accomplishing this is disclosed in Figures 1A, 2A, and 3C.

A roadable aircraft is a compromise between an aircraft of the known variety and a road vehicle. A road vehicle suffers with many disadvantages if it is bulky and unwieldly and aircraft by their very nature are bulky and unwieldly on the ground. The sustaining planes are usually attached to the fuselage at the center of gravity of the aircraft, when said wings are folded they usually pivot at the inner connections to the fuselage and thus protrude beyond the extremity of the tail of the aircraft. Then to stow the wings efficiently, a means is necessary to move the sustaining planes forward relative to the fore and aft axis of the fuselage. A means of accomplishing this is shown in Figures 2, 3A, 3B, and 3C.

The mechanism claimed as part of this invention which I have conceived to reduce my invention to practice consists roughly of: a carriage 14, which may be referred to as a center section, designed to allow the inner ends of the wings 10 in folding to move vertically and longitudinally relative to the fore and aft axis of fuselage 15; means of connection 40, 41, and 43 between the inner ends of the respective outer wings 10 to allow said outer wings to pass one over the other in folding, means 21 of suspending the wings 10 from each other, means 24 of suspending the wings 10 from the fuselage 15, and means 25 of suspending the disconnected struts 11 and 12 from the wings 10.

My invention resides in a structure which is self-explanatory as an observation of the appended drawings reveals. The outstretched wings 10 are supported intermediately between the inner ends and wing tips by two struts, 11 and 12, which intersect and connect universally with each other and to the wing. Strut 12 is universally and independently connected to the assembly by means of eye bolt 29, which also serves to connect strut 11 to the universal connection 28, which in turn is connected to wing spar 25 by means of fitting 23 and eye bolt 32, thereby giving wing 10 the desired rotation on two axes when the wings are being folded.

Struts 11 and 12 are connected to the universals 60 at the bottom of the fuselage, said universals 60 being retained in fittings 27 by means of a slidable pin 26. Said slidable pin 26 is retained in the assembly by a spring, shown in Figure 3C but not designated by number, which can be overcome by manual pressure to disengage the struts 11 and 12 from the fuselage 15 to complete the folding operations of wing 10.

The wings 10 are universally connected at the inner ends at the front spar 25 to the center section 14. The rear connection 51 and 69 of wing 10 is either conventional or unconventional and not claimed as part of this invention, and therefore is only illustrated diagrammatically. To the front spar is fixedly secured a fitting 39 designed to connect to universal fitting 40 by means of bolt 43; to this assembly is connected a center section 14 comprised of a rod to connect and properly space the outer wings 10.

Center section 14 is rotatably supported by a suitable fitting integral with the upper extremity of 13 which comprises the functional unit of the carriage assembly. Axial movement of 14 is resisted by a thrust nut 42 contained at either end, all of which is illustrated in detail in Figures 7 and 8. It will also be noted that downwardly extending from 13 is a male lug 44 which projects into a female lug 51, and is thereby engaged to the fuselage assembly by a slidable pin 45. Said pin 45 is operated manually through a lever 48 by means of reciprocating rotation on pivotable axis 47 and transmitted by link 46 as is indicated by arrow 50 in Figure 6A.

The lower extremity of 13 extends into an open housing 28a, Figures 9 and 3C, and is hinged on a stub shaft 20. 57, an integral part with housing 28a, limits the movement of 13 in the direction indicated by the lowermost end of arrow 58. Movement in the aforesaid direction allows a latch, hinged at and by rivet 37 and protruding by constant spring tension—spring 33—into housing 28a, to bar the retreat of 13, thereby cooperating with 57 in maintaining 14 and the inner ends of wings 10 connected thereto in the extreme forward position relative to the fuselage. A suitable knob 34 is provided to manually release the latch 36 thereby allowing the wings 10 to return to the normal fully extended position.

21, 24, and 25 are auxiliary suspending links used only to secure the wings and struts in the folded position. In Figure 10, link 24 is shown in enlarged fragments and is similar to 21 and 25 except for length. The detailed parts of link 24 comprises: a main body consisting of a steel tube 24, two identical pins 63 bent at right angles and fixedly secured to both extremities of tubing 24, 67 serving as a shoulder to limit any tendency there may be for any fitting into which 63 may be inserted to slide toward the radius of the right angle bend of 63; and 64 is a pin of smaller diameter bent at right angles and slidably retained by 66 a suitable distance upwards from tube 24, tension of the wire spring 65 constantly retaining 64 butting against 63.

When inserting 63 into a fitting such as eye bolt 32, the opening of which is indicated by 62 in Figure 4, pin 64 gives way to manual pressure applied at arrow 68 and away from 63, allowing thereby the insertion to be limited only by 67. After 63 is thrust into a fitting designed for its use such as eye bolt 32 against 67, manual pressure on 64 is released and the spring 65 snaps 64 against 63, thereby imprisoning the connection. Both ends of suspending link 24 are operated thus as the fragmental illustration of Figure 10 indicates.

There are two auxiliary suspending links 21, one on either side relative to the fuselage Figure 3C, suspending the upper folded wing 10R from the lower wing 10L by suitable fittings not shown on the respective wings. Two auxiliary links 24, one on either side relative to the fuselage Figure 3C, suspend the folded wings 10R and 10L from the fuselage. Auxiliary link 24 engages the wing 10L at 32 by inserting 63 into 62, and the opposite 63 of link 24 is engaged in a suitable fitting not shown on the fuselage. On the other side of the fuselage in Figure 3C the other auxiliary link 24 similarly suspends the trailing edge of 10L by means of suitable fittings not shown from the fuselage. Four auxiliary links 25 suspend struts 11 and 12 from the wings; one auxiliary link 25 for each strut engages a fitting not shown on the said struts and a fitting on the wing not shown to which the said respective strut is to be suspended.

From the drawings it is evident that the wings 10 must be folded manually, but mechanical folding is anticipated and shall be the subject of a succeeding application for Letters Patent.

Figure 2:
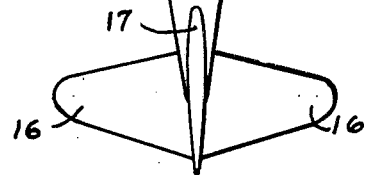
Figure 2 is a top view of the same airplane, the broken lines indicating the position of the right and left wings respectively with respect to the fuselage when the center section is moved to its most forward position, which is the first operation of the wing folding mechanism.
Figure 2A:
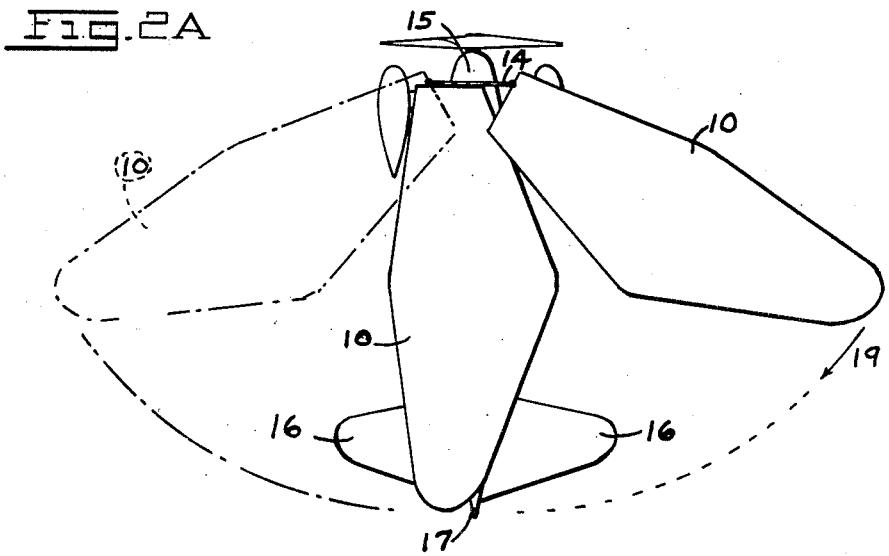
Figure 2A is a top view of the same airplane with the left wing in folded position on the top of the fuselage and the right wing poised for rotation to assume a folded position on the top of the left wing.

To manually fold the wings 10 of the airplane from the fully extended, as from the end of a flight illustrated by Figure 1, and dealing only with the structure claimed as a part of this invention, the lever 48 is first rotated indicated by arrow 50 to disengage the carriage assembly, 14 and 13, from the fuselage 15. Manual pressure is then applied forwardly until the lower extremity of 13 passes latch 36 and is therewith imprisoned between 36 and 57. The wings then take the position indicated by the broken lines in Figure 2, and Figure 3A being a side view with the wings in the same position.

Now each wing is folded separately and ordinarily, but not necessarily, requires the services of two operators, one to hold the wing 10 while the other removes struts 11 and 12 from the bottom of the fuselage and suspends said struts from the wing 10 with the auxiliary suspending links 25. The wing is then rotated, Figure 2A, into folding position longitudinally of the fuselage and suspended upwards from the said fuselage by auxiliary links 24. The opposite wing is dealt with likewise and folded on top of the other wing, Figures 1A and 3C, and suspended upwards from the under wing by auxiliary links 21.

It is observed in the foregoing paragraphs that a discriminating differentiation was made between aircraft and airplanes. It is therefore to be understood that the form of my invention hereby shown and described is to be taken as an example of the same and various changes in size, shape and arrangements may be resorted to to accomplish the same desired results, without departing from the spirit of my invention or the scope of the subjoined claims.

Having thus described my invention, what I claim and desire to protect by Letters Patent is:

1. In an aircraft, a fuselage, a wing supporting cradle pivotally mounted on the fuselage for fore and aft adjustment, and wings universally connected at their inner ends to the cradle whereby they may be either extended laterally in a common plane for flight, or shifted forward relative to the fuselage and folded horizontally one above the other for ground use.

2. In an aircraft, a fuselage, a wing supporting cradle pivotally mounted on the fuselage for fore and aft adjustment, wings universally connected at their inner ends to the cradle whereby they may be either extended laterally in a common plane for flight, or shifted forward relative to the fuselage and folded horizontally one above the other for ground use, releasable means to retain the cradle in its aft position, and releasable means to retain the cradle in its fore position.

3. In an aircraft, a fuselage, a wing supporting cradle mounted on the fuselage for both vertical and longitudinal movement, and wings universally connected at their inner ends to the cradle whereby they may be extended laterally from the fuselage on a common horizontal axis for flight when the cradle rests in an aft position, and may be raised above the fuselage and shifted forward by forward movement of the cradle, and folded horizontally one above the other for ground use.

4. In an aircraft, a fuselage, a cradle shiftably mounted on the fuselage for an arcuate path of travel on a vertical line longitudinally of the fuselage, and wings pivotally connected at their inner ends to the cradle extensible laterally adjacent the fuselage for flight when the cradle is in an aft position, and foldable for ground use longitudinally and horizontally one above the other above the fuselage when the cradle is in a forward position.

5. In an aircraft, a fuselage, a cradle shiftably mounted on the fuselage for an arcuate path of travel on a vertical line longitudinally of the fuselage, and wings pivotally connected at their inner ends to the cradle at opposite sides thereof extensible laterally adjacent the fuselage for flight when the cradle is in an aft position, and foldable for ground use longitudinally and horizontally one above the other above the fuselage when the cradle is in a forward position.

6. In an aircraft, a fuselage, a cradle shiftably mounted on the fuselage for an arcuate path of travel on a vertical line longitudinally of the fuselage, wings pivotally connected at their inner ends to the cradle extensible laterally adjacent the fuselage for flight when the cradle is in an aft position, and foldable for ground use longitudinally and horizontally one above the other above the fuselage when the cradle is in a forward position, and supporting means on the fuselage to sustain the wings at an intermediate point thereof when folded.

7. In an aircraft, a fuselage, a cradle shiftably mounted on the fuselage for an arcuate path of travel on a vertical line longitudinally of the fuselage, wings pivotally connected at their inner ends to the cradle extensible laterally adjacent the fuselage for flight when the cradle is in an aft position, and foldable for ground use longitudinally and horizontally one above the other above the fuselage when the cradle is in a forward position, supporting means on the fuselage to sustain the wings at an intermediate point thereof when folded, and a latching device to secure the wings together when folded.

8. In an aircraft, a fuselage, a cradle shiftably mounted on the fuselage for an arcuate path of travel on a vertical line longitudinally of the fuselage, and cambered wings pivotally connected at their forward inner ends to the cradle extensible laterally for flight when the cradle is in its extreme aft position, and foldable longitudinally above the fuselage for ground use horizontally one above the other with the trailing edge of one wing faired under the leading edge of the other wing when the cradle is in its extreme forward position.

9. In an aircraft, a fuselage, a cradle shiftably mounted on the fuselage for an arcuate path of travel on a vertical line longitudinally of the fuselage, and wings having a universal pivotal connection at their inner ends to the cradle extensible laterally adjacent the fuselage for flight when the cradle is in an aft position, and foldable for ground use longitudinally and horizontally one above the other above the fuselage when the cradle is in a forward position.

10. In an aircraft, a fuselage, a cradle shiftably mounted on the fuselage for an arcuate path of travel on a vertical line longitudinally of the fuselage, wings pivotally connected at their inner ends to the cradle extensible laterally adjacent the fuselage for flight when the cradle is in an aft position, and foldable for ground use longitudinally and horizontally one above the other above the fuselage when the cradle is in a forward position, and struts universally pivoted at one end to the fuselage and at their other end to the wings and shiftable with the wings fore and aft.

11. In an aircraft, a fuselage, a cradle shiftably mounted on the fuselage for movement longitudinally of the fuselage, and wings pivotally connected at their inner ends to the cradle extensible laterally adjacent the fuselage for flight when the cradle is in an aft position, and foldable for ground use longitudinally and horizontally one above the other above the fuselage when the cradle is in a forward position.

12. In an aircraft, a fuselage, wing supporting members shiftably mounted on the fuselage for movement longitudinally of the fuselage, and wings pivotally connected at their inner ends to the supporting members extensible laterally adjacent the fuselage for flight when the supporting members are in an aft position, and foldable for ground use longitudinally and horizontally one above the other above the fuselage when the supporting members are in a forward position.

DANIEL R. ZUCK.